US008991459B2

(12) United States Patent
Krietemeyer et al.

(10) Patent No.: US 8,991,459 B2
(45) Date of Patent: Mar. 31, 2015

(54) REINFORCED RADIAL TIRE

(75) Inventors: Matthew F. Krietemeyer, Akron, OH (US); Mitchel S. Kritzell, Wadsworth, OH (US); Ryota Kawai, Tokyo (JP)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 241 days.

(21) Appl. No.: 13/293,153

(22) Filed: Nov. 10, 2011

(65) Prior Publication Data

US 2013/0118669 A1 May 16, 2013

(51) Int. Cl.
*B60C 15/00* (2006.01)
*B60C 15/06* (2006.01)

(52) U.S. Cl.
CPC ..... *B60C 15/0045* (2013.04); *B60C 2015/0639* (2013.04); *B60C 15/0628* (2013.04); *B60C 2015/0664* (2013.04); *B60C 2015/0621* (2013.04); *B60C 2015/066* (2013.04)
USPC ......................................... 152/541

(58) Field of Classification Search
None
See application file for complete search history.

(56) References Cited

U.S. PATENT DOCUMENTS

| | | | | |
|---|---|---|---|---|
| 3,052,275 | A | * | 9/1962 | Hylbert, Jr. .................. 152/541 |
| 4,573,511 | A | * | 3/1986 | Kabe et al. ................... 152/548 |
| 5,164,029 | A | * | 11/1992 | Oohashi et al. .............. 152/546 |
| 5,522,443 | A | | 6/1996 | Ueyoko et al. |
| 5,526,863 | A | | 6/1996 | Hodges et al. |
| 5,795,416 | A | | 8/1998 | Willard et al. |
| 5,871,600 | A | | 2/1999 | Oare et al. |
| 6,135,183 | A | | 10/2000 | Oare et al. |
| 6,142,204 | A | | 11/2000 | Omoteda et al. |
| 6,269,857 | B1 | | 8/2001 | Kanai et al. |
| 6,401,777 | B1 | | 6/2002 | Verbeke-Ensch et al. |
| 6,719,029 | B2 | | 4/2004 | Close |
| 6,776,207 | B2 | * | 8/2004 | Ogawa .......................... 152/542 |
| 6,834,700 | B2 | | 12/2004 | Shida et al. |
| 7,712,498 | B2 | | 5/2010 | Sakaguchi et al. |
| 7,926,533 | B2 | | 4/2011 | Villanueva |
| 2005/0263230 | A1 | | 12/2005 | Merino Lopez |
| 2007/0137757 | A1 | | 6/2007 | Roman et al. |
| 2008/0149250 | A1 | | 6/2008 | Trares et al. |

(Continued)

FOREIGN PATENT DOCUMENTS

DE 102006020308 * 11/2007
EP 0463273 3/1995

(Continued)

OTHER PUBLICATIONS

Machine translation of JP 2011-93395, 2011.*

(Continued)

*Primary Examiner* — Justin Fischer

(57) ABSTRACT

A tire includes a pair of bead portions, with each bead portion having a bead core and a bead filler portion. A belt is disposed below a circumferential tread, in the tread portion of the tire. A carcass ply has a main portion extending between the pair of beads and a pair of turn-up portions that wrap around the beads and terminate below the belt, in the tread portion of the tire. The tire further includes a pair of nylon reinforcements, wherein each nylon reinforcement is disposed axially between a respective bead filler portion and a main portion of the carcass ply. Additionally, each nylon reinforcement has a top end disposed above a top end of the respective bead filler portion. Each nylon reinforcement further has a bottom end disposed below the top end of the respective bead filler portion and above a respective bead core.

17 Claims, 3 Drawing Sheets

(56) References Cited

U.S. PATENT DOCUMENTS

| | | |
|---|---|---|
| 2009/0120551 A1 | 5/2009 | Yamamoto |
| 2009/0151845 A1 | 6/2009 | Skurich et al. |
| 2009/0308518 A1 | 12/2009 | Ueyoko |
| 2010/0065179 A1 | 3/2010 | Imhoff et al. |

FOREIGN PATENT DOCUMENTS

| | | | |
|---|---|---|---|
| JP | 56095709 | * | 8/1981 |
| JP | 04108008 | * | 4/1992 |
| JP | 06227214 | * | 8/1994 |
| JP | 2001-130229 | * | 5/2001 |
| JP | 2002-144823 | * | 5/2002 |
| JP | 2004-352174 | * | 12/2004 |
| JP | 2007-050843 A | | 1/2007 |
| JP | 2007-302161 | * | 11/2007 |
| JP | 2009-001073 A | | 8/2009 |
| JP | 2011-25823 | * | 2/2011 |
| JP | 2011-93395 | * | 5/2011 |

OTHER PUBLICATIONS

Machine translation of JP 2001-130229, 2001.*
Machine translation of JP 2011-258523, 2011.*
Machine translation of JP 2002-144823, 2002.*
Machine translation of JP 2007-302161, 2007.*
Joong Sub Han; International Search Report and Written Opinion; Feb. 27, 2013; pp. 1-11; Korean Intellectual Property Office; Daejeon, Republic of Korea.
International Preliminary Report on Patentability; International Serial No. PCT/US2012/056447; Authorized Officer Nickitas-Etienne, Athina; May 22, 2014.

* cited by examiner

REINFORCED RADIAL TIRE

FIELD OF INVENTION

This disclosure relates to radial tires. More particularly, this disclosure relates to tires having a specific arrangement of carcass plies, reinforcements, and fillers.

BACKGROUND

Radial tires having carcass plies are known in the art. Known elements of a tire, such as the tread, carcass plies, belts, beads, fillers, and reinforcement elements affect multiple characteristics of a tire. The addition of, removal, or changes to such elements may affect a tire's performance in various conditions (e.g., wet, dry, snowy, icy), the noise produced by the tire, the life of the tire, and the efficiency of the vehicle.

SUMMARY OF THE INVENTION

In one embodiment, a tire has a tread portion and a belt disposed in the tread portion. The tire further includes a first bead portion, a second bead portion axially spaced from the first bead portion, a first sidewall portion disposed radially between the first bead portion and the tread portion, and a second sidewall portion disposed radially between the second bead portion and the tread portion. The tire also has a carcass ply including a main portion extending circumferentially about the tire from the first bead portion to the second bead portion, a first turn-up portion extending around the first bead portion and terminating in the tread portion, and a second turn-up portion extending around the second bead portion and terminating in the tread portion. A first reinforcement is disposed axially between the first bead portion and the main portion of the carcass ply. A second reinforcement is disposed axially between the second bead portion and the main portion of the carcass ply. A first high thin bead filler ("HTBF") is disposed axially between the first turn-up portion of the carcass ply and the first sidewall portion. A second HTBF is disposed axially between the second turn-up portion of the carcass ply and the second sidewall portion.

In another embodiment, a tire has a pair of sidewalls and a circumferential tread that defines a tread portion of the tire. The tire includes a pair of bead portions, with each bead portion having a bead core and a bead filler portion. A belt is disposed below the circumferential tread, in the tread portion of the tire. A carcass ply has a main portion extending between the pair of beads and a pair of turn-up portions that wrap around the beads and terminate below the belt, in the tread portion of the tire. The tire further includes a pair of nylon reinforcements, wherein each nylon reinforcement is disposed axially between a respective bead filler portion and a main portion of the carcass ply. Additionally, each nylon reinforcement has a top end disposed above a top end of the respective bead filler portion. Each nylon reinforcement further has a bottom end disposed below the top end of the respective bead filler portion and above a respective bead core, such that each nylon reinforcement is disposed only on the inside of the pair of bead portions.

In yet another embodiment, a radial tire includes a circumferential tread that defines a tread portion of the tire, and at least one belt disposed below the circumferential tread, in the tread portion of the tire. The tire further includes a pair of bead portions, with each bead portion having a bead core and a bead filler portion, and a pair of sidewalls, with each sidewall being disposed axially between the circumferential tread and a respective one of the pair of bead portions. The tire also includes a carcass ply having a main portion extending from bead to bead, and a pair of turn-up portions, wherein each turn-up portion terminates below the at least one belt, in the tread portion of the tire. At least one nylon reinforcement is disposed axially between one of the pair of beads and the main portion of the carcass ply. At least one HTBF is disposed axially between one of the pair of turn-up portions and one of the pair of sidewalls.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Bead" refers to the part of the tire that contacts the wheel and defines a boundary of the sidewall.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire between the tread and the bead.

"Tread" refers to that portion of the tire that comes into contact with the road under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
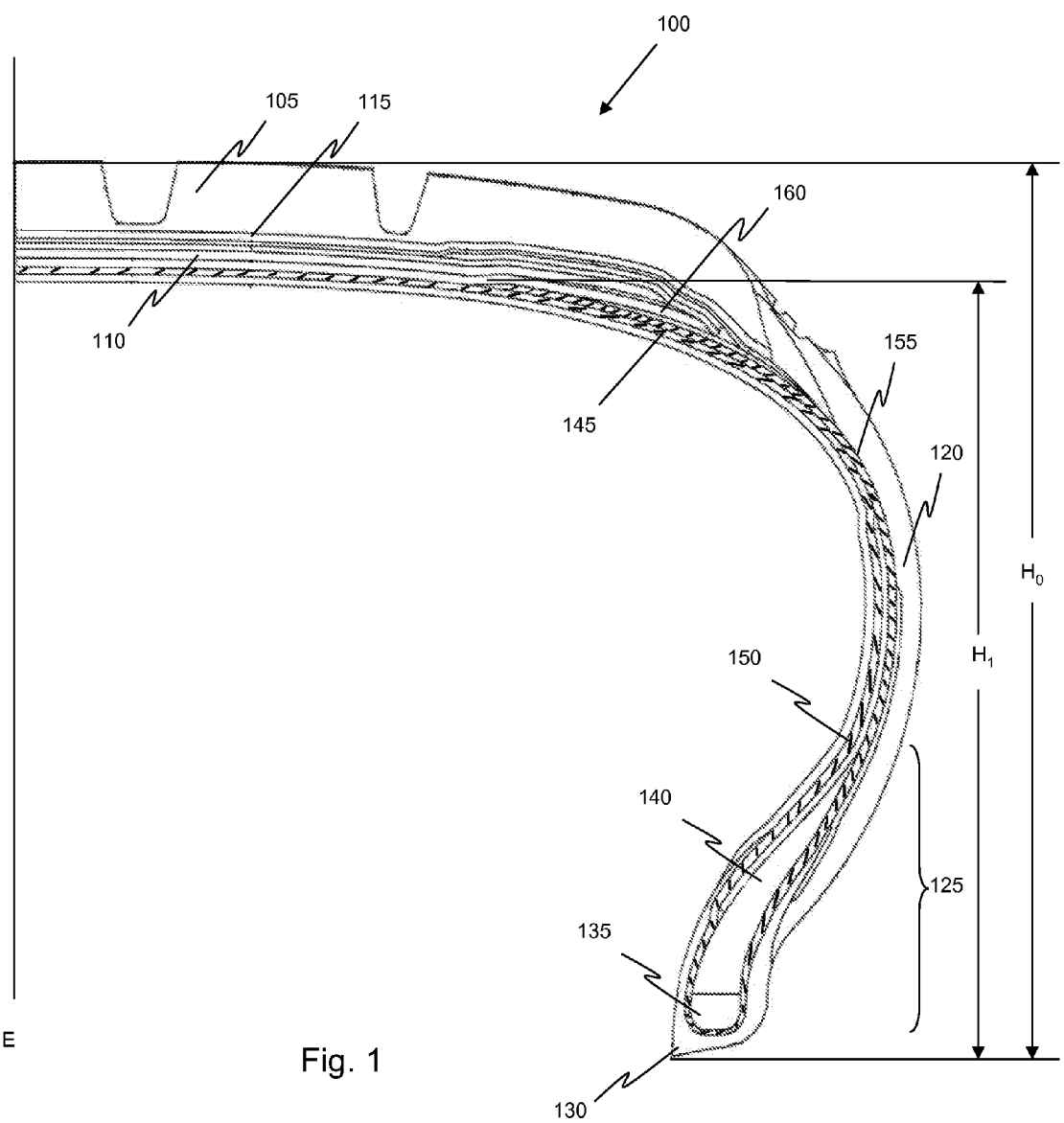
FIG. 1 is a partial cross section of one embodiment of a tire.

FIG. 1 is a partial cross section of one embodiment of a tire 100 having an equatorial plane E. The tire 100 includes a circumferential tread 105 that defines a tread portion of the tire. A plurality of belts 110 are disposed below the circumferential tread 105, in the tread portion of the tire. While the illustrated embodiment shows two belts, it should be understood that a single belt may be employed. Alternatively, three or more belts may be employed.

Cap plies 115 are disposed radially between the circumferential tread 105 and the belt 110. However, these components are optional and may be omitted.

Tire 100 further includes a sidewall 120, a bead portion 125, and a toe 130. The bead portion 125 includes a bead core 135 and a bead filler portion 140. The bead core 135 may be constructed of steel, or other metal. The bead filler portion 140 may be constructed of rubber, or another polymeric material.

The tire 100 has a section height $H_0$ that is measured from the outer surface of the tread 105 at the equatorial plane E to the toe 130. While only a quarter-section of the tire 100 is shown, it should be understood that the tire is substantially symmetrical and the other quadrants of the tire will have the same features discussed herein. Accordingly, the illustrated sidewall 120 is a first sidewall, and a second sidewall (not shown) is opposite and axially spaced from the first sidewall. Likewise, the illustrated bead portion 125 is a first bead portion, and a second bead portion (not shown) is opposite and axially spaced from the first bead portion. Additionally, the illustrated toe 130 is a first toe, and a second toe (not shown) is opposite and axially spaced from the first toe.

The tire 100 further includes a carcass ply 145. The carcass ply 145 has a main portion 150, a first turn-up portion 155, and a second turn-up portion (not shown). The main portion 150 extends circumferentially about the tire from the first bead portion 125 to the second bead portion (not shown). The first turn-up portion 145 wraps around the first bead portion 125 and terminates below the plurality of belts 120. Similarly, the second turn-up portion wraps around the second bead portion and terminates below the belt 110 in the tread portion of the tire. In one embodiment, the turn-up portions 155 of the carcass ply 145 contact one of the belts 120. In an alternative embodiment (not shown), the turn-up portions of the carcass ply are axially spaced from the plurality of belts.

In one embodiment, each turn-up portion 155 of the carcass ply 145 has a height $H_1$ that may range from 70% to 95% of the section height $H_0$. In an alternative embodiment, height $H_1$ may range from 80% to 90% of the section height $H_0$.

In an alternative embodiment (not shown), additional carcass plies may be employed.

In the illustrated embodiment, the tire 100 further includes belt edge inserts 160 disposed between the carcass plies 145 and the edge of the bottom belt 110. However, these components are optional and may be omitted.

Figure 2:
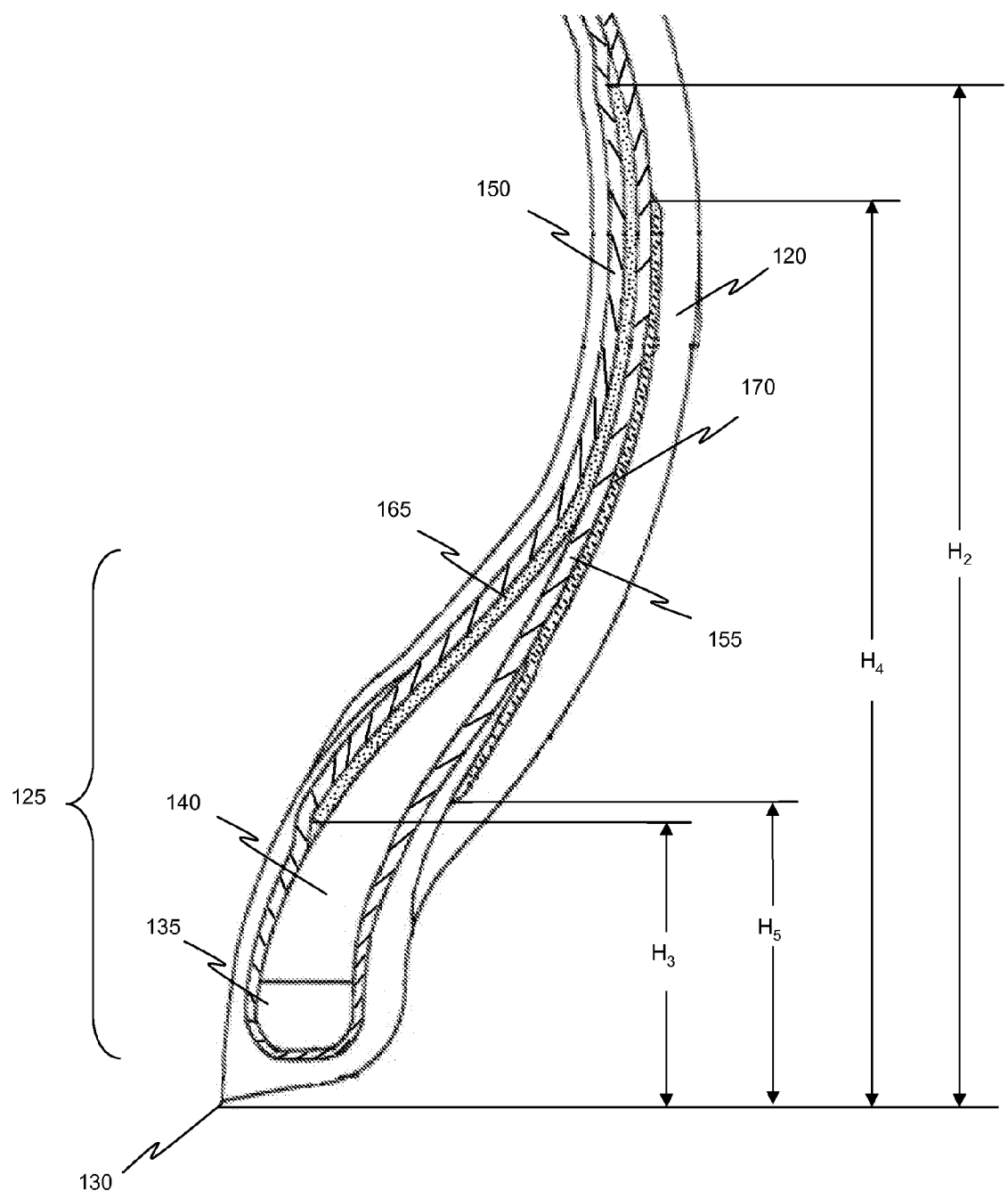
FIG. 2 is a detail view of a bead portion of the tire of FIG. 1.

FIG. 2 is a detail view of the sidewall 130 and bead portion 125 of the tire 100 of FIG. 1. The tire 100 further includes a reinforcement 165 disposed axially between the bead filler portion 140 and a main portion 150 of the carcass ply 150. The reinforcement 165 may be referred to as a "floating reinforcement" because it does not wrap around the bead portion of the tire. The reinforcement 165 may also be referred to as a "buried reinforcement" because it is "buried" between the bead filler portion 140 and the carcass ply 145. In one embodiment, the reinforcement 165 is constructed of nylon and has a 45° angle bias. In alternative embodiments, the reinforcement 165 may be constructed of steel or a polymeric material, and may be biased at an angle between 20° and 70° relative to the radius of the tire.

In one embodiment, the reinforcement 165 has a top end disposed at a height $H_2$ that is between 18% and 70% of the section height $H_0$. In an alternative embodiment, height $H_2$ is between 25% and 60% of the section height $H_0$. In the illustrated embodiment, the top end of the reinforcement 165 is disposed above a top end of the bead filler portion 140. In alternative embodiments (not shown), the top end of the reinforcement is disposed below the top end of the bead filler portion.

The reinforcement 165 further has a bottom end disposed at a height $H_3$ that is between 5% and 25% of the section height $H_0$. In the illustrated embodiment, the bottom end of the reinforcement 165 is disposed below the top end of the bead filler portion 140, but above the bead core 130. In this embodiment, the reinforcement 165 does not wrap around the bead portion 125. In alternative embodiments (not shown), the bottom end of the reinforcement may be disposed at or below the bead core. In another alternative embodiment, the reinforcement may wrap around the bead core. In still another alternative embodiment, the reinforcement may be omitted.

With continued reference to FIG. 2, the tire 100 further includes a high thin bead filler ("HTBF") 170 disposed axially between the turn-up portion 155 of the carcass ply 145 and the sidewall 120. In one embodiment, the HTBF 170 is constructed of substantially the same material as the bead filler 135. In alternative embodiments, the HTBF may be constructed of a different rubber or other elastomeric material.

In one embodiment, the HTBF 170 is coextruded with the sidewall 120 during construction of the tire 100. Alternatively, the HTBF may be rolled or otherwise fixed in its position. In an alternative embodiment (not shown), the HTBF may be omitted.

In one embodiment, the HTBF 170 has a top end disposed at a height $H_4$ that is between 30% and 70% of the section height $H_0$. In an alternative embodiment, height $H_4$ is between 37% and 65% of the section height $H_0$. In the illustrated embodiment, the top end of the HTBF 170 is disposed above a top end of the bead filler portion 140, but below the top end of the reinforcement 165. In an alternative embodiment (not shown), the top end of the HTBF is disposed below the top end of the bead filler portion. In another alternative embodiment (not shown), the top end of the HTBF is disposed above both the top end of the bead filler portion and the top end of the reinforcement.

In one embodiment, the HTBF 170 further has a bottom end disposed at a height $H_5$ that is between 10% and 30% of the section height $H_0$. In an alternative embodiment, height $H_5$ is between 14% and 25% of the section height $H_0$. In the illustrated embodiment, the bottom end of the HTBF 170 is disposed below the top end of the bead filler portion 140, but above the bead core 130 and above the bottom end of the reinforcement 165. In alternative embodiments (not shown), the bottom end of the HTBF may be disposed at or below the bottom end of the reinforcement. In other alternative embodiments (not shown), the bottom end of the HTBF may be disposed at or below the bead core.

While only one bead portion is shown, it should be understood that the tire 100 is substantially symmetrical and that the other side of the tire will have substantially the same elements described herein. In other words, the reinforcement 165 is a first reinforcement, and a second reinforcement (not shown) is opposite and axially spaced from the first reinforcement. Likewise, the illustrated HTBF 170 is a first HTBF, and a second HTBF (not shown) is opposite and axially spaced from the first HTBF. In alternative embodiments, the reinforcement, the HTBF, or both may only be disposed on only one side of the tire.

Figure 3:
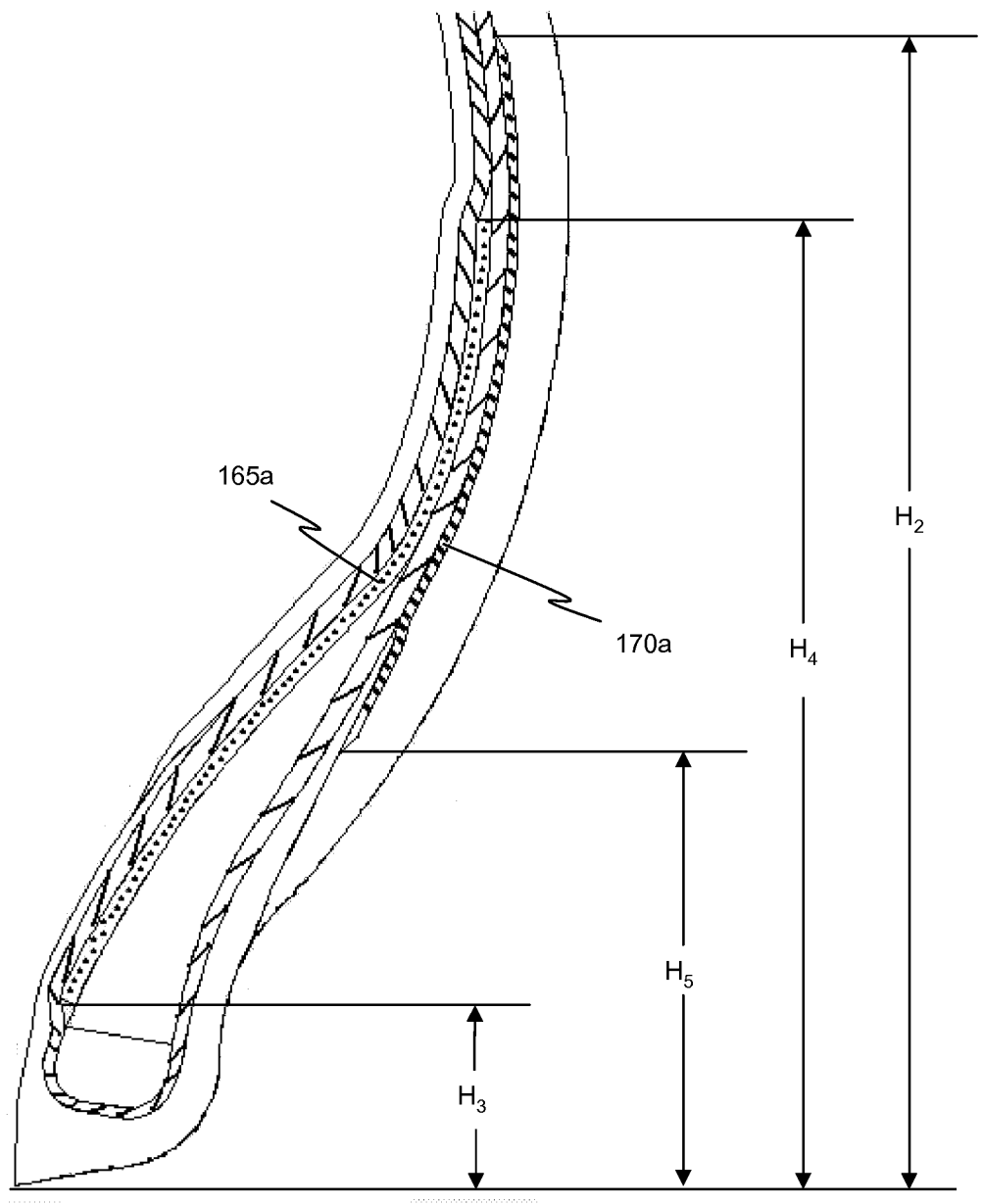
FIG. 3 is a detail view of a bead portion of an alternative embodiment of a tire.

FIG. 3 illustrates a detail view of a bead portion of an alternative embodiment of a tire. In this embodiment an alternative reinforcement 165a and an alternative HTBF 170a are employed. In this embodiment, the alternative reinforcement 165a has a top end disposed at a height $H_2$ that is between 18% and 70% of the section height $H_0$. The reinforcement also has a bottom end disposed at a height $H_3$ that is between 5% and 25% of the section height $H_0$. In this respect, it does not differ from the reinforcement 165 illustrated in FIGS. 1 and 2.

Additionally, the alternative HTBF 170a has a top end disposed at a height $H_4$ that is between 30% and 70% of the section height $H_0$. Further, the alternative HTBF 170a has a bottom end disposed at a height $H_5$ that is between 10% and 30% of the section height $H_0$. As with the reinforcement, this range of dimensions is not different from the HTBF 170 illustrated in FIGS. 1 and 2. However, in this embodiment, the height $H_4$ of the top end of the alternative HTBF 170a is greater than the height $H_2$ of the top end of the alternative reinforcement 165a.

In the illustrated embodiment, the height $H_5$ of the bottom end of the alternative HTBF 170a is greater than the height $H_3$ of the bottom end of the alternative reinforcement 165a. Here, the difference is more pronounced than that shown in FIG. 2.

The combination of the disclosed carcass ply formation, the reinforcement, and the HTBF, increases the torsional stiffness of the tire. The configuration also reduces vehicle noise level, particularly in the low frequency range near 80 Hz, while providing satisfactory vehicle ride and handling. The configuration also allows for lower mass and rolling resistance while maintaining necessary stiffness for vehicle performance.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
   a tread portion;
   a belt disposed in the tread portion;
   a first bead portion, wherein the first bead portion includes a first bead core and a first bead filler;
   a second bead portion axially spaced from the first bead portion, wherein the second bead portion includes a second bead core and a second bead filler;
   a first sidewall portion disposed radially between the first bead portion and the tread portion;
   a second sidewall portion disposed radially between the second bead portion and the tread portion;
   a carcass ply including: a main portion extending circumferentially about the tire from the first bead portion to the second bead portion, a first turn-up portion extending around the first bead portion and terminating in the tread portion, and a second turn-up portion extending around the second bead portion and terminating in the tread portion;
   a first nylon reinforcement disposed axially between the first bead portion and the main portion of the carcass ply such that the first nylon reinforcement is disposed only on the inside of the first bead filler, wherein the first nylon reinforcement has a bottom end disposed below a top end of the first bead filler, and the first nylon reinforcement further has a top end disposed above a top end of the first bead filler at a height between 18% and 70% of a section height of the tire, where the section height of the tire is a height measured from an outer surface of the tread portion at an equatorial plane to a toe of the tire;
   a second nylon reinforcement disposed axially between the second bead portion and the main portion of the carcass ply such that the second nylon reinforcement is disposed only on the inside of the second bead filler, and the second nylon reinforcement has a bottom end disposed below a top end of the second bead filler, and the second nylon reinforcement further has a top end disposed above a top end of the second bead filler at a height between 18% and 70% of the section height of the tire;
   a first high thin bead filler ("HTBF") disposed axially between the first turn-up portion of the carcass ply and the first sidewall portion,
     wherein the first HTBF has a substantially uniform thickness,
     wherein the first HTBF has a bottom end disposed below a top end of the first bead filler,
     wherein the first HTBF further has a top end disposed above a top end of the first bead filler, and
     wherein the top end of the first nylon reinforcement is disposed above the top end of the first HTBF; and
   a second HTBF disposed axially between the second turn-up portion of the carcass ply and the second sidewall portion,
     wherein the second HTBF has a substantially uniform thickness,
     wherein the second HTBF has a bottom end disposed below a top end of the second bead filler,
     wherein the second HTBF further has a top end disposed above a top end of the second bead filler, and
     wherein the top end of the second nylon reinforcement is disposed above the top end of the second HTBF.

2. The tire of claim 1, wherein the first HTBF, the second HTBF, the first bead filler, and the second bead filler are all constructed of substantially the same material.

3. The tire of claim 1, wherein the first and second nylon reinforcements are biased at an angle between 20° and 60°.

4. The tire of claim 1, wherein the first HTBF is coextruded with the first sidewall portion and the second HTBF is coextruded with the second sidewall portion.

5. A tire having a pair of sidewalls and a circumferential tread that defines a tread portion of the tire, the tire comprising:
- a pair of bead portions, each bead portion having a bead core and a bead filler portion;
- a belt disposed below the circumferential tread, in the tread portion of the tire;
- a carcass ply having a main portion extending between the pair of bead portions and a pair of turn-up portions that wrap around each bead core and terminate below the belt, in the tread portion of the tire;
- a pair of high thin bead fillers ("HTBF"), each HTBF having a substantially uniform thickness and being disposed axially between one of the turn-up portions of the carcass ply and one of the sidewalls, wherein each HTBF has a bottom end disposed radially above one of the bead cores; and
- a pair of nylon reinforcements,
  - wherein each nylon reinforcement is disposed axially between a respective bead filler portion and a main portion of the carcass ply,
  - wherein each nylon reinforcement has a top end disposed above a top end of the respective bead filler portion at a height between 18% and 70% of a section height of the tire, where the section height of the tire is a height measured from an outer surface of the circumferential tread at an equatorial plane to a toe of the tire,
  - wherein each nylon reinforcement has a bottom end disposed below the top end of the respective bead filler portion and above a respective bead core, such that each nylon reinforcement is disposed only on the inside of the pair of bead portions, and
  - wherein the top end of each nylon reinforcement is disposed above a top end of a respective HTBF.

6. The tire of claim 5, wherein the top end of each HTBF is disposed above the top end of one of the bead filler portions, and wherein a bottom end of each HTBF is disposed below the top end of the one of the bead filler portions.

7. The tire of claim 5, wherein each HTBF is coextruded with one of the pair of sidewalls.

8. The tire of claim 5, wherein the belt includes a plurality of belts.

9. The tire of claim 5, wherein the bead filler portion of each bead portion and each of the HTBFs are all constructed of substantially the same material.

10. A radial tire comprising:
- a circumferential tread that defines a tread portion of the radial tire;
- at least one belt disposed below the circumferential tread, in the tread portion of the radial tire;
- a pair of bead portions, each bead portion having a bead core and a bead filler portion;
- a pair of sidewalls, each sidewall being disposed axially between the circumferential tread and a respective one of the pair of bead portions;
- a carcass ply having a main portion extending from bead to bead, and a pair of turn-up portions, wherein each turn-up portion terminates below the at least one belt, in the tread portion of the radial tire;
- at least one nylon reinforcement disposed axially between one of the pair of bead portions and the main portion of the carcass ply, such that the at least one nylon reinforcement is disposed only on the inside of the bead portion, wherein the at least one nylon reinforcement has a top end disposed at a height between 18% and 70% of a section height of the radial tire, where the section height of the radial tire is a height measured from an outer surface of the circumferential tread at an equatorial plane to a toe of the radial tire; and
- at least one high thin bead filler ("HTBF") having a substantially uniform thickness and disposed axially between one of the pair of turn-up portions and one of the pair of sidewalls, wherein a top end of the at least one nylon reinforcement is disposed above a top end of the at least one HTBF, and wherein the at least one HTBF has a bottom end disposed radially above one of the bead cores.

11. The radial tire of claim 10, wherein the at least one nylon reinforcement includes a nylon reinforcement on each side of the radial tire.

12. The radial tire of claim 10, wherein the at least one HTBF includes an HTBF on each side of the radial tire.

13. The radial tire of claim 10, wherein the at least one nylon reinforcement has a top end disposed above a top end of one of the bead filler portions, and a bottom end disposed above one of the bead cores.

14. The radial tire of claim 10, wherein the at least one HTBF has a top end disposed above a top end of the bead filler portion and below a top end of the at least one nylon reinforcement.

15. The radial tire of claim 10, wherein the bead filler portion of each bead portion and the at least one HTBF are all constructed of substantially the same material.

16. The radial tire of claim 10, wherein the at least one nylon reinforcement is biased at an angle between 20° and 60°.

17. The radial tire of claim 10, wherein the at least one HTBF is coextruded with one of the pair of sidewalls.

* * * * *